Aug. 9, 1966     L. H. SEMON, SR     3,265,108
LOCK NUT ASSEMBLY
Filed Oct. 14, 1964
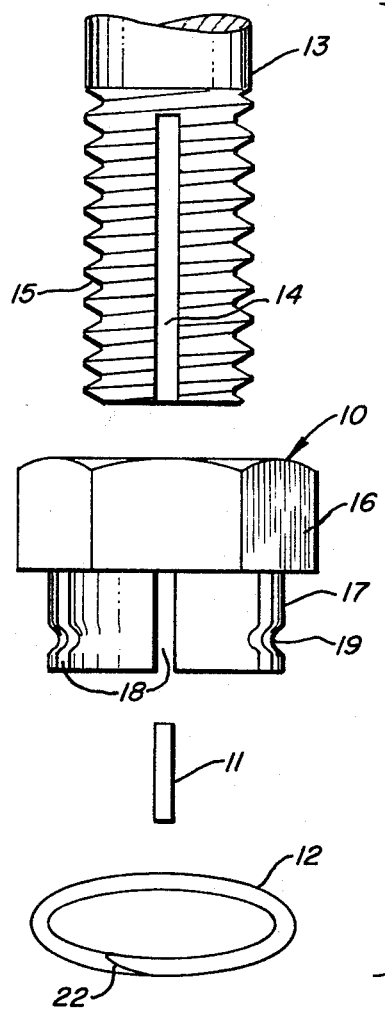
FIG. 1
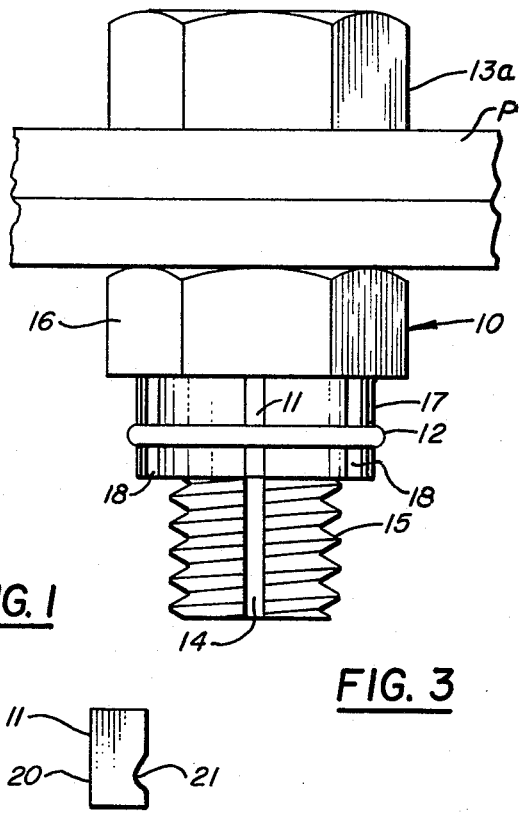
FIG. 3
FIG 1a
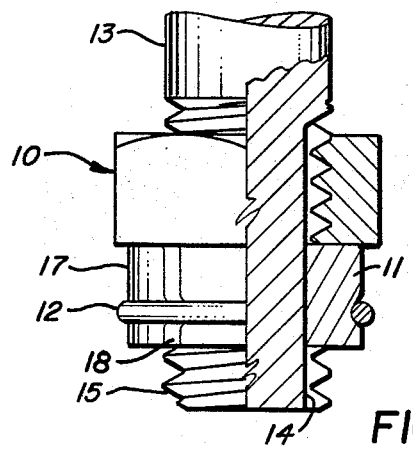
FIG. 2
INVENTOR.
LORENTZ H. SEMON, SR., DECEASED
BY EVERETT R. SEMON, ADMINISTRATOR
BY
MAHONEY, MILLER, & RAMBO
BY
ATTORNEYS

United States Patent Office 3,265,108
Patented August 9, 1966

3,265,108
LOCK NUT ASSEMBLY
Lorentz H. Semon, Sr., deceased, late of Zanesville, Ohio, by Everett R. Semon, administrator, Rte. 1, Box 15, Zanesville, Ohio
Filed Oct. 14, 1964, Ser. No. 403,946
1 Claim. (Cl. 151—8)

This invention relates to a lock nut assembly. More particularly, this invention deals with a positively locking nut assembly which, when properly assembled and set on a threaded bolt, will neither further loosen or tighten.

The positive locking nut assembly of this invention is composed of a minimum number of parts. The nut itself is of the typical castellated type with slight modifications and can be used on a threaded bolt, stud, pin, or rod of simple cylindrical form which is provided with a keyway. No special tools are required in assembling the nut on the bolt or in disassembling and removing it therefrom. When assembled on the threaded bolt, the nut will be positively locked in position and cannot turn thereon to further tighten or loosen. There are a minimum number of parts employed in the nut assembly and the parts are so assembled and connected that they cannot work loose even when subjected to excessive vibration.

In the accompanying drawing, there is illustrated a preferred form of this invention and in this drawing:

FIGURE 1 is an exploded, elevational view illustrating the associated parts of the lock nut assembly.

FIGURE 1a is a detail in side elevation of the key used in the assembly.

FIGURE 2 is a view partly in elevation and partly in section showing the assembled structure.

FIGURE 3 is an elevational view showing the assembled structure clamping together a pair of plates.

With reference to the drawing, the lock nut assembly of this invention is illustrated as comprising a nut member 10, a key or locking pin member 11, and a split ring 12, all of which are adapted to be assembled on a threaded cylindrical bolt 13, or the like, which is provided with a longitudinally extending slot or keyway 14 formed in the threaded portion 15 thereof.

The nut member 10 preferably is generally of the castellated type having an angular body 16, for example, hexagonal, so it can be engaged and rotated by a wrench and having a depending skirt 17 with a plurality of radially outwardly and downwardly opening key-receiving slots 18 formed thereon at angularly spaced, parallel positions. A bolt-receiving opening is provided axially through the body and skirt of the nut and is interiorly threaded, the opening being of a size that the nut 10 will fit the bolt 13, and the threads formed in the interior of the nut being such that they will engage and cooperate with the threads on the bolt. The skirt 17 and, consequently, the slots 18, preferably extend substantially one-half the axial extent of the nut and are radially disposed in the skirt and will extend radially of the bolt 13 when the nut is screwed thereon. The slots 18 are open at the extremity of the skirt.

Adjacent to but spaced from the lower edge or extremity of the skirt 17, there is formed in the exterior surface of the skirt 17 a groove 19 which extends completely around the skirt but, of course, is interrupted at the various slots 18. This groove is adapted to receive the annular split slip ring 12 and the radial slots 18 are adapted to selectively receive the key or lock pin 11.

The key 11 is preferably made of flat steel stock and has an inner straight edge 20 and a parallel outer edge with a notch 21 therein which is so located that it is adapted to correspond with the groove 19 when the key is inserted in any of the locking slots 18. The key 11 is of a length corresponding to the length of the slots 18 and has blunt opposed ends. It is of a depth corresponding to the depth of the keyway 14 plus the depth of the slots 18 or thickness of the skirt 17.

The split slip ring 12 is preferably made of spring steel and is provided with tapered, overlapping ends 22 where it is split. It is of such a nature that after it is expanded and slipped over the skirt 17 of the nut, it will contract and snap into the groove 19, being of such a diameter that it will lie snugly in the groove and if the key 11 is in one of the slots 18, will extend through the notch 21 thereof to hold the key radially in place.

In assembling the structure, the nut member 10 is first screwed onto the threaded end portion 15 of the bolt 13. When the nut has reached the desired position, for example, to clamp the plates P between the head 13a of the bolt and the nut 10 (FIGURE 3), it can be locked in a fixed axial position by slipping the key 11 radially through one of the radial sockets or slots 18 in the skirt 17 into the keyway 14 of the bolt with which it is radially aligned. Because the slots 18 are open-ended, insertion of the key will be facilitated. Then the split retaining ring 12 is slipped over the skirt 17 to engage the outer edge of the key 11, at the notch 21, and hold it in keying or locking position between the nut and the bolt. Thus, the nut will be locked positively on the bolt and cannot rotate in either direction thereon.

It will be apparent that this invention provides a lock nut having a minimum number of parts which are the interiorly threaded nut itself with the slotted skirt, the key for fitting in any of the skirt slots to extend into an aligning keyway in the bolt, and the split retaining ring which will slip over the skirt and retain the key in keying or locking position.

The lock nut assembly of this invention employs a slightly modified castellated type nut and can be used on the usual cyindrical bolt. No tapered bolts or tapered sleeves or other such tapered members are required. The slotted nut is of a type readily available and the ring-receiving groove can be readily formed in the skirt. The split retaining ring is of a type commonly available. The ring itself can be of a simple O-cross section except at its overlapping ends where the two overlapping parts cooperate to form an O-section. The key may be formed of simple flat steel stock. No special tools are needed in assembling or disassembling the structure. It is only necessary to index one radial slot of the nut with the bolt keyway. Vibration will not work the slit ring out of its groove and, therefore, the key pin will be locked in place so that the bolt will not tighten or loosen because of vibration tending to rotate it on the bolt.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described this invention, what is claimed is:

A lock nut assembly for mounting on a bolt having a threaded end portion with a key slot formed in said portion and extending radially thereinto and axially of the bolt so that the slot has an inner axially extending surface, said assembly comprising a nut having a body with an axial opening therethrough which is threaded so that it can be screwed onto said threaded bolt end portion, an axially extending skirt on said nut body having an extremity and an outer circular peripheral surface and provided with radial slots at angularly spaced intervals and any one of which is adapted to be aligned with said bolt key slot when the nut is screwed onto said threaded end portion thereof, said radial skirt slots being open both at their radial outer sides and at their ends at the extremity of the skirt but being closed at their ends at said body, a flat key fitted radially into one of said skirt slots so that it will extend into the bolt key slot when aligned therewith and having inner and outer axially extending edges, said key slot being of a greater axial extent than that of said radial skirt slots, said key being of a radial depth substantially equal to the combined radial depth of the key slot and the aligned radial skirt slot so that when its inner edge is in keying position in contact with the inner surface of the key slot its outer edge is substantially flush with said outer peripheral surface of said skirt, said key having opposed ends and being of uniform axial length equal to the distance from the closed end of said radial skirt slot to the said extremity of the skirt so that when its one end is in contact with the closed end of the receiving radial slot in the skirt its opposite end is substantially flush with said extremity of the skirt, said skirt having a groove formed in the outer peripheral surface thereof intermediate its extent, said key having a notch in its outer edge intermediate its opposed ends which will align with said groove when the key is inserted into one of said radial skirt slots and the aligning key slot, and a split ring of O-cross section extending completely around said skirt fitted into said aligning groove and notch and having tapered overlapping ends for retaining the key in keying position both radially and axially.

References Cited by the Examiner

UNITED STATES PATENTS

| | | | |
|---|---|---|---|
| 599,385 | 2/1898 | Caylor | 151—5 |
| 960,926 | 6/1910 | Hoops | 85—88 |
| 1,225,419 | 5/1917 | Donahue | 151—6 |
| 2,902,303 | 9/1959 | Davis | 85—8.8 |

FOREIGN PATENTS 267,103   8/1929   Italy.

EDWARD C. ALLEN, *Primary Examiner.*